US009902391B2

United States Patent
Miro-Padonavi et al.

(10) Patent No.: US 9,902,391 B2
(45) Date of Patent: Feb. 27, 2018

(54) ENERGY MANAGEMENT METHOD ON A HYBRID VEHICLE COMPRISING A TRANSMISSION WITH DISCRETE RATIOS

(71) Applicant: RENAULT s.a.s., Boulogne-Billancourt (FR)

(72) Inventors: Thomas Miro-Padonavi, Maurepas (FR); Maxime Debert, Versailles (FR); Yann Chamaillard, Le Bardon (FR); Guillaume Colin, Olivet (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/037,556

(22) PCT Filed: Nov. 4, 2014

(86) PCT No.: PCT/FR2014/052795
§ 371 (c)(1),
(2) Date: May 18, 2016

(87) PCT Pub. No.: WO2015/082784
PCT Pub. Date: Jun. 11, 2015

(65) Prior Publication Data
US 2016/0297420 A1    Oct. 13, 2016

(30) Foreign Application Priority Data
Dec. 3, 2013    (FR) .................................... 13 61974

(51) Int. Cl.
*B60W 10/06*    (2006.01)
*B60K 6/20*    (2007.10)
(Continued)

(52) U.S. Cl.
CPC .............. *B60W 20/11* (2016.01); *B60K 6/20* (2013.01); *B60W 10/06* (2013.01); *B60W 10/08* (2013.01); *B60W 10/11* (2013.01); *Y02T 10/6286* (2013.01)

(58) Field of Classification Search
USPC ...... 701/22; 180/65.21, 65.265, 65.28, 65.29
See application file for complete search history.

(56) References Cited

U.S. PATENT DOCUMENTS 8,151,918 B2 *    4/2012    Junca .................... B60K 6/48
                                                                  180/65.28
9,134,353 B2 *    9/2015    Jia ...................... G06Q 40/04
(Continued)

FOREIGN PATENT DOCUMENTS

CN    101870241 B  *  7/2014    ......... B60H 1/00735
CN    102826028 B  *  7/2016    ......... B60H 1/00285
(Continued)

OTHER PUBLICATIONS

Energy management using fuzzy logic, on HEV; Yacine Gaoua; Stéphane Caux; Pierre Lopez; Josep Domingo Salvany 2013 World Electric Vehicle Symposium and Exhibition (EVS27) ; Year: 2013; pp. 1-7, DOI: 10.1109/EVS.2013.6914762.*
(Continued)

*Primary Examiner* — Cuong H Nguyen
(74) *Attorney, Agent, or Firm* — Oblon, McClelland, Maier & Neustadt, L.L.P.

(57) ABSTRACT

A method manages energy of a power unit of a hybrid vehicle. The power unit includes at least one internal combustion engine and an electric drive machine, coupled to wheels of the vehicle by a transmission with discrete ratios. The method includes minimizing, at each operating point of the energy, an energy criterion linked to a sum of consumption of the internal combustion engine and an electrical consumption of the electrical machine multiplied by an
(Continued)

Figure 1:
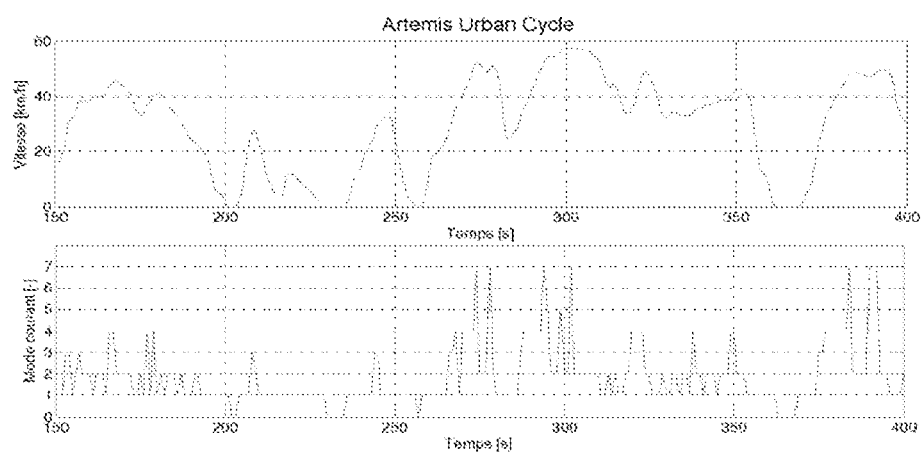

equivalence factor weighting a supply of energy from the internal combustion engine and a supply of energy of electrical origin. The minimized criterion is a mixed criterion which is a sum of an energy criterion and a discomfort criterion linked to management of kinematic modes of the transmission.

9 Claims, 2 Drawing Sheets

(51) Int. Cl.
*B60W 10/08* (2006.01)
*B60W 10/11* (2012.01)
*B60W 20/11* (2016.01)

(56) References Cited

U.S. PATENT DOCUMENTS

| | | | | |
|---|---|---|---|---|
| 9,150,132 | B2 * | 10/2015 | Hoke | B60H 1/00285 |
| 9,546,654 | B2 * | 1/2017 | Rabhi | F16C 33/306 |
| 9,758,015 | B2 * | 9/2017 | Hoke | B60H 1/00742 |
| 2009/0112399 | A1 | 4/2009 | Buur et al. | |
| 2010/0051366 | A1 * | 3/2010 | Junca | B60K 6/48 180/65.265 |
| 2011/0093147 | A1 * | 4/2011 | Kaltenbach | F02N 11/08 701/22 |
| 2011/0118920 | A1 | 5/2011 | Kim | |
| 2011/0130901 | A1 | 6/2011 | Mori et al. | |
| 2012/0312520 | A1 * | 12/2012 | Hoke | B60H 1/00285 165/203 |
| 2013/0131900 | A1 * | 5/2013 | Yu | B60K 6/445 701/22 |
| 2015/0094968 | A1 * | 4/2015 | Jia | G06Q 40/04 702/60 |
| 2015/0360538 | A1 * | 12/2015 | Hoke | B60H 1/00285 165/203 |
| 2016/0072287 | A1 * | 3/2016 | Jia | G06Q 40/04 700/295 |

FOREIGN PATENT DOCUMENTS

| | | | |
|---|---|---|---|
| EP | 2 052 939 A2 | 4/2009 | |
| FR | 3044423 A1 * | 6/2017 | ......... G01R 31/3693 |
| JP | 11220801 A * | 8/1999 | ............ B60H 1/004 |
| JP | 2005059797 A * | 3/2005 | ............ B60H 1/004 |
| JP | 2017015327 A * | 1/2017 | ............... F25B 1/00 |
| WO | WO 2011015431 A1 * | 2/2011 | .......... B60H 1/0025 |

OTHER PUBLICATIONS

Optimal Energy Management for a mechanical-hybrid vehicle with cold start conditions; Koos van Berkel; Wouter Klemm; Theo Hofman; Bas Vroemen; Maarten Steinbuch; 2013 European Control Conference (ECC); Year: 2013; pp. 452-457.*

Optimal load management of electric heating and PEV loads in a residential distribution system in Sweden; David Steen; Salem Al-Yami; Le Anh Tuan; Ola Carlson; Lina Bertling; 2011 2nd IEEE PES International Conference and Exhibition on Innovative Smart Grid Technologies; Year: 2011; pp. 1-7, DOI: 10.1109/ISGTEurope.2011.6162706.*

Energy management and optimization; Ilse Cervantes; 2014 IEEE Transportation Electrification Conference and Expo (ITEC) Year: 2014; pp. 1-66, DOI: 10.1109/ITEC.2014.6861824.*

Learning energy management strategy for hybrid electric vehicles; J. -S. Chen; M. Salman; 2005 IEEE Vehicle Power and Propulsion Conference; Year: 2005; pp. 68-73.*

Optimal Calibration of Map-Based Energy Management for Plug-In Parallel Hybrid Configurations: A Hybrid Optimal Control Approach; Markus Schori; Thomas J. Boehme; Benjamin Frank; Bernhard P. Lampe; IEEE Transactions on Vehicular Technology Year: 2015, vol. 64, Issue: 9; pp. 3897-3907.*

Recent advances on the energy management of a Hybrid Electric vehicle; D. S. Efstathiou; A. K. Petrou; P. Spanoudakis; N. C. Tsourveloudis; K. P. Valavanis; 2012 20th Mediterranean Conference on Control & Automation (MED) ; Year: 2012 pp. 896-901.*

International Search Report dated Feb. 16, 2015 in PCT/FR14/052795 Filed Nov. 4, 2014.

French Search Report dated Jul. 18, 2014 in French Application No. 1361974 Filed Dec. 3, 2013.

* cited by examiner

ENERGY MANAGEMENT METHOD ON A HYBRID VEHICLE COMPRISING A TRANSMISSION WITH DISCRETE RATIOS

The present invention concerns the management of the distribution of energy flows in a hybrid power unit of a motor vehicle.

More precisely, the object of the invention is a method for managing the energy of a hybrid vehicle power unit comprising at least one internal combustion engine and an electric drive machine, coupled to the wheels of the vehicle by a transmission with discrete ratios, by minimization, at each operating point of the motor, of an energy criterion linked to the sum of the consumption of the internal combustion engine and the electrical consumption of the electrical machine.

A hybrid power unit of a motor vehicle with front- or rear-wheel drive comprises an internal combustion engine and one or more electrical machines supplied by at least one battery on-board the vehicle.

Control systems for hybrid power units are designed to manage the operation and synchronization of the different motors as a function of the travel conditions, in order to limit the fuel consumption and minimize the emissions of polluting particulates. This is called management of the thermal and electrical energy flows, designating in particular the control strategy implemented in the control system with the aim of optimizing the distribution of power between the energy flows of the internal combustion engine and the energy flows of electrical origin.

In the particular case of hybrid vehicles with discrete ratios, the transmission ratio is selected by a calculation unit. The vehicle's control system has two degrees of freedom for providing the torque requested by the driver while minimizing consumption: firstly the transmission ratio, and secondly the torque distribution between the electrical machine(s) and the internal combustion engine.

Publication FR 2 988 674 discloses a method for determining an energy equivalence factor, representing the weighting applied between the provision of energy from the internal combustion engine and the provision of energy of electrical origin, in a vehicle energy management law (LGE), the purpose of which is to determine the torque distribution between the internal combustion engine and the electrical machine(s) in real time. The distribution must observe the driver's wishes while minimizing the global consumption of the vehicle on its journey. The purpose of the equivalence factor is to minimize the global energy consumption at one operating point. It may be controlled discretely as a function of the instantaneous energy state of the battery and of an energy target, and the driving conditions of the vehicle.

If the vehicle has automatic transmission, the LGE must also determine the transmission ratio to be applied in order to reduce the energy consumption as far as possible. However, the application of a single conventional energy criterion in the energy management law can lead to erratic control of gear changes, or a non-optimum reduction in consumption.

The object of the present invention is to integrate the choice of ratio in the energy management law of a hybrid vehicle with automatic transmission, by finding the best compromise between an energy criterion (consumption) and driving comfort (occurrence of gear changes).

To this end, it proposes that the minimized criterion is a mixed criterion ($H_{mixed}$), which is the sum of an energy criterion and a discomfort criterion linked to the management of kinematic modes of the transmission.

Preferably, the discomfort criterion is proportional to the energy criterion.

The measures proposed allow management of comfort problems in the optimization of consumption, in order to find the best compromise.

In a non-limitative application of the invention, the kinematic modes include at least two transmission ratios in electric mode and two transmission ratios in hybrid mode.

Figure 2:
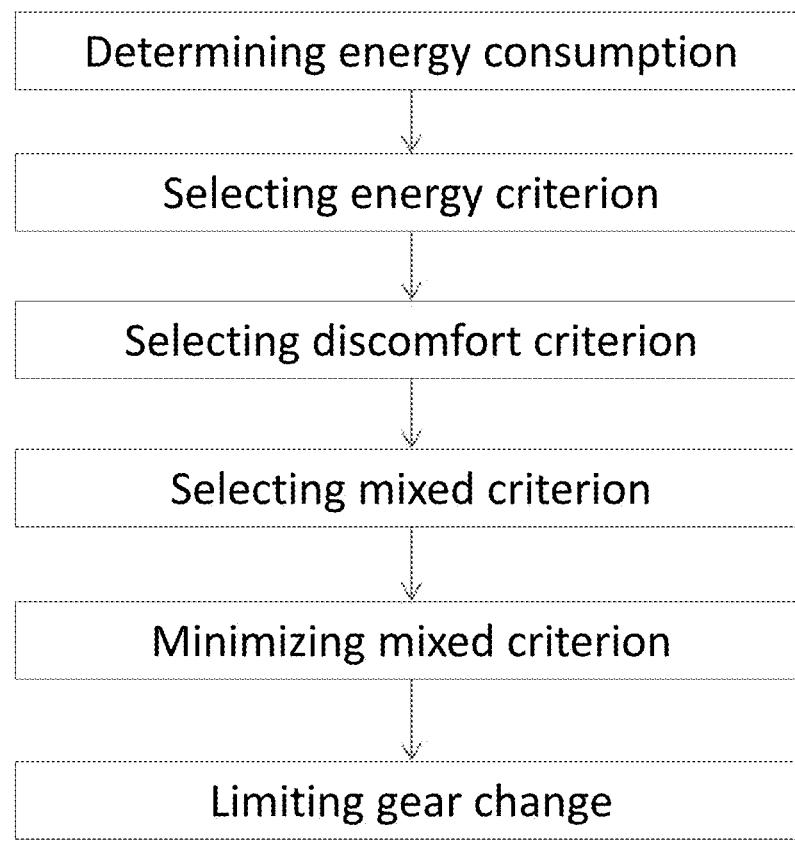

Further characteristics and advantages of the present invention will become clear from the following description of a non-limitative embodiment thereof, with reference to the attached drawings. FIG. 1 illustrates the application of an energy management law selecting a ratio which minimizes consumption at each moment. FIG. 2 shows a flow chart of the method according to the invention.

The global energy consumption of a hybrid vehicle is the sum of the consumption of the internal combustion engine (function of the effective torque and the engine speed) and the consumption of the electrical machine (function of its torque and speed).

The consumption of the internal combustion engine is determined from a fuel flow map as a function of an operating point (torque $C_{th}$, speed $\omega$). The electrical consumption from the battery is deduced from the electrical power absorbed or emitted by the machine as a function of the torque applied and its speed. It may be weighted in the LGE by an equivalence factor which translates the predominance of the electrical energy over fuel in the minimization, since it depends on the level of charge of the battery. In this calculation, the electrical power exchanged by the battery is divided by the calorific value of the fuel used, in order to be translated into a fuel flow and become homogenous with the engine power consumption. We can then determine an energy criterion H fulfilling the equation:

$$H = \text{Conso\_thermique}(C_{th}, \omega_{th}) + s \cdot (\text{Conso\_batt})$$

where H is a fuel flow expressed in grams per second and s is the equivalence factor, a function of the battery charge level.

Such a method minimizes, for each operating point of the engine, an energy criterion H linked to the sum of the consumption of the internal combustion engine Conso_thermique and the electrical consumption of the electrical machine Conso_batt multiplied by an equivalence factor s, weighting the supply of energy from the internal combustion engine and the supply of energy of electrical origin.

In general, the distribution of engine/machine torque and the kinematic mode imposed on the transmission by the LGE are intended to minimize the energy criterion H. However, if the transmission is controlled as a function of minimization of the energy criterion, it can quickly assume an erratic operation, the imposed rate of gear changes being too high to be applied under good conditions. In fact, if the LGE selects the ratio which minimizes energy cost H at each moment, a gear change may be imposed even if the energy gain is infinitesimal.

FIG. 1 illustrates the succession of kinematic modes requested by the LGE to minimize the energy criterion H from a particular example on a conventional cycle, called the Artemis Urban Cycle, for a power unit having at least two ratios in electric mode, ZE1 and ZE2, and two ratios in hybrid mode, HYB1 and HYB2, or four current kinematic modes. The rate of request of mode changes in this cycle is 14.5 changes per minute, or 49 changes/km.

To limit the gear changes, the invention proposes to integrate a criterion of discomfort, induced by the transmission ratio changes, in the traditional energy criterion H of the LGE. The desired aim is to impose a gear change only if the resulting energy gain is sufficiently great to compensate for the resulting discomfort. The kinematic mode adopted thus becomes that which minimizes a new criterion, called the mixed energy/comfort criterion $H_{mixed}$. As a result, the management of transmission ratios, or more generally of the kinematic modes of the transmission, finds an acceptable compromise between the energy efficiency of the power unit (GMP) and driving and passenger comfort.

According to the invention, the energy criterion to be minimized is a mixed function $H_{mixed}$, where a discomfort criterion D is added to the criterion H defined above:

$$H_{mixed} = \underbrace{\frac{H}{\text{Energy criterion}}} + \underbrace{[H \times \text{Comfort\_penalty}(\text{Current mode, Target mode})]}_{\text{Discomfort criterion}}$$

The discomfort criterion D is the product of the energy criterion H and a "penalty" which is expressed as a function of the current kinematic mode and of the kinematic mode for which the criterion is to be evaluated. D introduces into the equation an "energy surcharge" which is added to the energy criterion H to penalize mode changes.

The discomfort criterion is preferably proportional to the energy criterion, so that the rate of mode changes is homogenous over the entire range of use of the vehicle, in particular for all values of the energy criterion H.

The discomfort criterion D is expressed preferably as an absolute value, so as always to be positive even if the energy criterion H is negative, in particular in a situation of "regenerative braking". The comfort penalty reflects a discomfort specific to the mode change concerned: in fact, not all changes of kinematic mode of a transmission are equivalent in terms of discomfort, in particular since certain shifts are performed without torque interruption and others are performed with torque interruption.

The mixed criterion, which is minimized in accordance with the invention, is the sum of the energy criterion H and the discomfort criterion D linked to the management of kinematic modes of the transmission. For this, D may be the product of the energy criterion H and a comfort penalty A linked to a possible change of kinematic mode of the transmission.

On mode changes, the comfort penalty A may be expressed as follows:

Comfort penalty(Current mode,Target mode)=$K \times \beta$
(Current mode,Target mode)

where K is a calibration constant which allows global influencing of the penalty of all possible mode changes. The comfort penalty is the product of a calibration constant K by a square matrix containing the penalty $\beta$ of transition between each of the changes of the transmission modes. The matrix $\beta$ may contain the individual penalty of each mode change. In the particular case of a hybrid architecture with nine kinematic modes, $\beta$ is a matrix of 9*9, containing the penalty for 81 possible transitions for this transmission between a current mode and a target mode.

$$\beta = \begin{bmatrix} \overbrace{\begin{matrix} C_{1,1} & \cdots & C_{1,9} \\ \vdots & \ddots & \vdots \\ C_{9,1} & \cdots & C_{9,9} \end{matrix}}^{\text{Current mode}} \end{bmatrix} \Big\} \text{Target mode}$$

In this matrix, the penalty $C_{i,j}$ corresponding to the transition from current mode i to target mode j is therefore found on line i and column j of $\beta$. $\beta$ is a calibration matrix which must be adapted to the architecture of each transmission concerned. The method selected for determining the transition costs of $\beta$ is based on the mechanical steps composing each transition. The transitions between two kinematic modes are composed from a series of operational sequences, including for example:

synchronization of the electrical machine,
  synchronization of the internal combustion engine,
  starting of the internal combustion engine,
  stoppage of the internal combustion engine, or
  an interruption in torque.

Thus a penalty can be calibrated for each of these sequences, the calibration being greater as the sequence is judged to cause greater discomfort. The total cost of the transition $C_{i,j}$ is expressed as the sum of the costs of the sequences which it entails (coefficient 1) or not (coefficient 0), or in this example:

$C_{i,j}$=(0;1)*Cost of engine synchronization+(0;1)*Cost of machine synchronization+(0;1)*Cost of starting engine+(0;1)*Cost of stopping engine+(0;1) *Cost of torque interruption The comfort penalty may be expressed as a percentage (without dimension). The comfort criterion is then a percentage of the energy criterion: the greater the discomfort of the transition, the higher this percentage must also be.

In the particular case of an automatic hybrid transmission, the kinematic modes of which include at least two ratios in electric mode ZEV1, ZEV2 and two ratios in hybrid mode HYB1, HYB2, the determination of the kinematic mode applied by the LGE under the constraint of comfort can be illustrated as follows. If the current kinematic mode is ZEV1, the acceptable kinematic modes are ZEV1, ZEV2, HYB1, HYB2, and the transitions with torque interruption are penalized heavily (matrix $\beta$ calibrated accordingly). The table below shows, for each mode, the energy criterion H associated with the optimum distribution of thermal/electric torque. The kinematic mode associated with the lowest energy criterion is ZEV2, which would be applied without taking account of the comfort constraint.

|  | Energy criterion H [g/s] | Classification on energy criterion | Comfort penalty [%] | Comfort criterion [g/s] | Mixed criterion $H_{mixed}$ [g/s] | Classification on mixed criterion |
|---|---|---|---|---|---|---|
| ZEV1 | 1.6 | 3 | 0 | 0 | 1.6 | 2 |
| ZEV2 | 1.3 | 1 | 30 | 0.39 | 1.69 | 3 |
| HYB1 | 1.4 | 2 | 10 | 0.14 | 1.54 | 1 |
| HYB2 | 2 | 4 | 40 | 0.8 | 2.8 | 4 |

In this example, the comfort penalty has been calibrated at 10% for a start of the internal combustion engine and at 30% for a torque interruption. The current mode being ZEV1, the penalty for reaching this is 0 since this choice does not necessitate any change. The penalty for mode ZEV2 is 30% since it leads to a torque interruption. The penalty for mode HYB1 is 10% since the transition to this mode requires starting of the engine. Finally, the penalty for HYB2 is 40% since the transition to HYB2 would lead to an interruption of torque and the starting of the engine.

In this example, the kinematic mode minimizing the mixed criterion is HYB1. This therefore is the one selected as a compromise between fuel consumption and comfort. In fact, the interruption in torque is heavily penalized, which explains why mode ZEV2 was avoided in favor of HYB1. If the calibration of a comfort penalty had penalized the starting of the engine more heavily, a ZEV mode would have been selected instead of HYB1.

In conclusion, it must be emphasized that in hybrid architectures with "all electric" or "purely internal combustion engine" modes, the strict application of conventional gear change laws does not guarantee observation of a reference battery charge level. Also, a transmission management system based purely on the minimization of an energy criterion is not really acceptable, since the change rate is always too high to meet the requirements of driving comfort and mechanical reliability of the transmission. However, a transmission management system based on a conventional shift law, depending on vehicle speed and position of the accelerator pedal, does not allow full exploitation of the potential for reducing fuel consumption offered by a hybrid power unit. The solution proposed, which is based on the minimization of a mixed energy/comfort criterion, leads to a transmission management system which observes the desired compromise between fuel consumption and comfort thanks to the calibration of the comfort penalty. The transitions may thus be penalized more heavily or less heavily, depending on their effect on driving comfort. The formulation of the mixed criterion is very general and this method may be applied to a very wide variety of power units (GMP).

The specific adaptation of the method to a given GMP lies in the calibration of the comfort penalty. The non-limitative application example described above concerns a hybrid vehicle. However, the method may be applied under the same conditions to the transmission management of an internal combustion engine power unit which is not a hybrid unit. In particular, the energy criterion H may be replaced by a criterion adapted to the internal combustion engine power unit, in particular the fuel flow associated with a transmission ratio, which allows observation of the driver's wishes.

The invention claimed is:

1. A method for managing driving comfort and energy consumption of a power unit of a hybrid vehicle, the power unit comprising at least one internal combustion engine and an electric drive machine, coupled to wheels of the hybrid vehicle by a transmission with gears with discrete ratios, comprising:
    determining a consumption of the internal combustion engine and an electrical consumption of the electric drive machine;
    selecting an energy criterion, said energy criterion being based on a sum of the consumption of the internal combustion engine and the electrical consumption of the electric drive machine multiplied by an equivalence factor weighting a supply of energy from the internal combustion engine and a supply of energy of electrical origin;
    selecting a discomfort criterion, said discomfort criterion being based on a comfort level for a driver in said hybrid vehicle;
    selecting a mixed criterion based on a sum of the energy criterion and the discomfort criterion;
    minimizing said mixed criterion resulting in a minimized mixed criterion; and
    limiting changes of said gears of the transmission based on said minimized mixed criterion thereby managing driving comfort and energy consumption of said hybrid vehicle.

2. The method as claimed in claim 1, wherein the discomfort criterion is proportional to the energy criterion.

3. The method as claimed in claim 2, wherein the discomfort criterion is a product of the energy criterion and a comfort penalty linked to a possible change of kinematic modes of the transmission.

4. The method as claimed in claim 3, wherein the comfort penalty is a product of a calibration constant by a square matrix which contains a penalty of transition between each of the changes of the kinematic modes of the transmission.

5. The method as claimed in claim 4, wherein the penalty for transition between the kinematic modes is based on a sequence of operations specific to the transition concerned.

6. The method as claimed in claim 1, wherein said discrete ratios include at least two ratios in electric mode and two ratios in hybrid mode, and wherein said selecting of said energy criterion is performed based in part on said discrete ratios.

7. The method as claimed in claim 1, wherein said gears changes of the transmission are imposed based on the discomfort criterion induced by a transmission ratio changes.

8. The method as claimed in claim 1, wherein the discomfort criterion is expressed as an absolute value.

9. The method as claimed in claim 5, wherein the sequence of operations for the transition between two kinematic modes includes:
    synchronization of the electric drive machine,
    synchronization of the internal combustion engine,
    starting of the internal combustion engine,
    stoppage of the internal combustion engine, or
    an interruption in torque.

* * * * *